United States Patent [19]
Imataki et al.

[11] 4,212,518
[45] Jul. 15, 1980

[54] IMAGE DISPLAY DEVICE

[75] Inventors: Hiroyuki Imataki; Masatsune Kobayashi; Tokuya Ohta, all of Yokohama, Japan

[73] Assignee: Canon Kabushiki Kaisha, Tokyo, Japan

[21] Appl. No.: 890,966

[22] Filed: Mar. 28, 1978

[30] Foreign Application Priority Data

Feb. 13, 1977 [JP] Japan .................................. 52-15752
Feb. 14, 1977 [JP] Japan .................................. 52-15531
Apr. 8, 1977 [JP] Japan .................................. 52-40012

[51] Int. Cl.² .............................................. G02F 1/17
[52] U.S. Cl. .................................. 350/357; 252/408; 252/500
[58] Field of Search .................. 350/357; 252/408, 500

[56] References Cited

U.S. PATENT DOCUMENTS

| | | | |
|---|---|---|---|
| 3,282,160 | 11/1966 | Jones et al. ........................... | 350/357 |
| 3,451,741 | 6/1969 | Manos .................................. | 252/408 |
| 3,652,149 | 3/1972 | Rogers ................................. | 350/357 |
| 3,806,229 | 4/1974 | Schoot et al. ......................... | 252/408 |
| 3,912,368 | 10/1975 | Ponjee et al. ......................... | 350/357 |
| 4,018,508 | 4/1977 | McDermott et al. ................. | 350/357 |
| 4,059,341 | 11/1977 | Zeller ................................... | 350/357 |
| 4,073,570 | 2/1978 | Korinek ............................... | 350/357 |

OTHER PUBLICATIONS

"Hackh's Chemical Dictionary," 4th Edition, McGraw-Hill Book Co., N.Y., p. 171 (1969).

Primary Examiner—Teddy S. Gron
Attorney, Agent, or Firm—Fitzpatrick, Cella, Harper & Scinto

[57] ABSTRACT

An image display device comprises in combination:
a cell container,
at least a pair of electrodes,
an electrically responsive electrochromic medium accommodated in said cell container, said electrochromic medium comprising a complexion.

14 Claims, 6 Drawing Figures

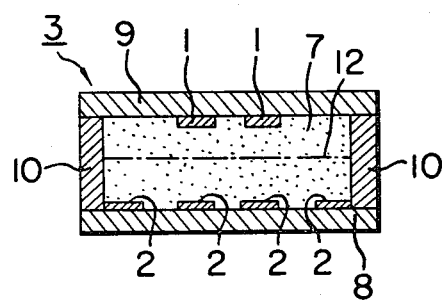
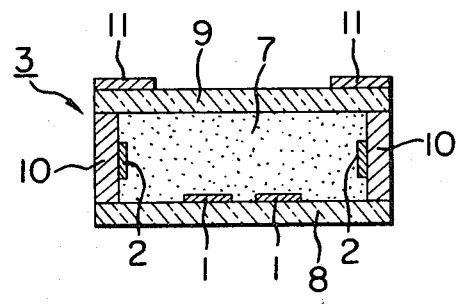
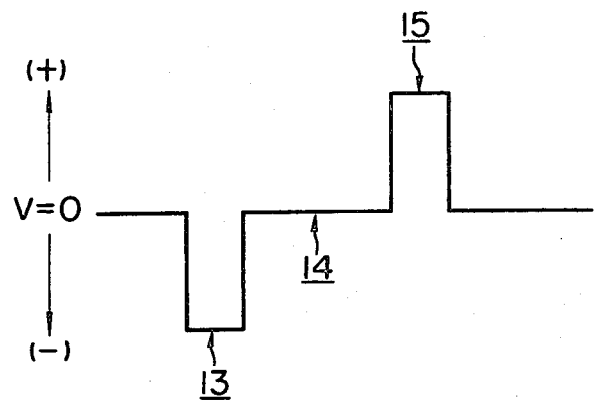

IMAGE DISPLAY DEVICE

BACKGROUND OF THE INVENTION

1. Field of the Invention

This invention relates to an image display device which utilizes the electrochemical color forming and bleaching phenomenon. More particularly, it is concerned with an image display device which utilizes an improved electrically responsive color forming and bleaching medium to prolong its durability against repetitive uses.

The term "electrochemical color forming and bleaching phenomenon" is meant by a reversible color forming and bleaching phenomenon dependent on the electric polarity, in which, generally speaking, a certain element forms color depending on its electric conduction, and bleaches the color (i.e., reinstatement to the original color by its electric conduction in an opposite polarity to that for the color forming, or by heat application, or by a combination of these treatments. This is usually called "electrochromic phenomenon".

Mechanism for causing the electrochromic phenomenon is not always simple, although, in most cases, it is considered due to the so-called oxidation-reduction reactions between an electrolyte and a color forming substance. In this case, there can be made no clear distinction between the electrolyte and the color forming substance in their material aspect, i.e., one and the same substance may, in some cases, be the color forming substance as well as the electrolyte. From another standpoint, this electrochromic phenomenon is understood to take place by variations in the light absorbing characteristic of such substance due to injection of electrons into the center of color element. In reality, however, such phenomenon is considered to occur as the result of combination of the oxidation-reduction reactions and the electron injection.

Since the electrochromic phenomenon is to cause color which a material possesses primarily to change electrically, the color combination is of wide varieties. Also, whether the substance can permit light to pass therethrough, or reflect or scatter it is not determined by the property of the substance per se, but by a method of forming a layer of such substance. Therefore, in the case of using such substance as the display element, it should have such a property that it may be formed either in the light transmission type or in the light reflection type.

Among various kinds of such electrochromic phenomenon, a phenomenon based on the electrolysis of the substance due to electric current, i.e., oxidation and reduction reactions of the substance (redox reaction) is especially called "electrochemichromism", the study of which is now in fashion in the field of image display technology.

In general, for the display device, the technology of which is cased on the electrochemichromism, there has been known to use a cell which accommodates therein a working electrode and a counter electrode having a light transmitting or reflecting property, and an electrically responsive chromic substance consisting of an electrochemical color forming and bleaching substance, an electrolyte, and a solvent capable of dissolving these substances. This electrochemical color forming and bleaching substance reversibly changes its oxidation and reduction conditions by passage therethrough of electric current to be able to bring about a detectable change on the outer appearance of the working electrode, i.e., the reduction in the substance causes the color forming, while the oxidation therein causes the color bleaching, or vice versa. These two electrodes and the electrolytic solution are accommodated in an appropriate housing having means, through which the working electrode can be seen. The electrochemical color forming and bleaching substance in such image display device is capable of accepting or donating electrons, by which it usually turns into a radical ion having a high degree of light absorption in the visible range of the spectrum, and, at the same time, this radical ion combines with an anion existing in the medium to form on the working electrode a color forming body insoluble in the medium.

The above-described cell for the image display device is driven in three stages, i.e., (1) a write-in operation to the working electrode, which takes place when a direct current voltage is applied thereto from outside so that the working electrode may be in the negative polarity and the counter electrode in the positive polarity; (2) a memory operation which takes place when the external voltage application is interrupted and the circuit is opened (the write-in operation on the working electrode being continued); and (3) an erasing operation of the contents written in on the working electrode by application of a direct current voltage from outside in a manner to render the working electrode to assume the positive polarity, and the counter electrode the negative polarity. Incidentally, it is also possible to effect the write-in operation with the working electrode being in the positive polarity.

2. Description of Prior Arts

U.S. Pat. No. 3,712,709 describes the image display device of the above-described type, in which the color forming and bleaching medium consisting of N,N'-di(p-cyanophenyl)-4,4'-bipyridinium salt, potassium chloride, sodium ferrocyanide, diluted sulfuric acid, etc., is used.

U.S. Pat. No. 3,806,229 describes an image display apparatus, wherein a color forming and bleaching medium consisting of salts of dipyridinium compounds, and an adjuvant such as substituted hydroquinones having a standard oxidation-reduction potentials of 0.7 v and above, ferrous salts, or 1,4-di(dialkylamino)benzenes, etc, is held between opposing electrodes.

Further, U.S. Pat. No. 3,930,717 discloses a similar type of image display device.

In either of the abovementioned image display devices as taught in the prior patents, however, there has been pointed out that repetitive durability of the image display element, i.e., its lifetime, constitutes a problem. In more detail, such phenomena as insufficiency in color forming, insufficiency in color bleaching, occurrence of side-reaction in the color forming, occurrence of irregularity in the formed color, changes in color tone, etc. remarkably curtail the lifetime of the image display element. The main cause for such shortened service life of the element is presumed to be electrode contamination. The contamination is said to be caused by various factors such as impurities contained in the electrochemical color forming and bleaching substance, products from chemical changes in such electrochemical color forming and bleaching substance, impurities discharged from the cell container, inadequacy in the driving system, and others, all these factors being combined sophisticatedly.

To improve such disadvantages, there have been proposed improved techniques concerning new adjuvants or auxiliary agents to be added to the color forming and bleaching substance, or the color forming and bleaching medium.

For example, U.S. Pat. No. 4,018,508 discloses an image display device which provides the most highly improved service life. In this image display device, there is used the color forming and bleaching medium consisting of N-(p-cyanophenyl) substituted derivatives which are bicyclic compounds having two nitrogen containing rings, an auxiliary redox system in the form of $Fe^{++} \rightleftarrows Fe^{+++}$, and a carboxylic acid complexing agent. The auxiliary redox system is used for reversibly effecting the electrochemical oxidation-reduction reactions of the color forming and bleaching substance with good balance, while the carboxylic acid complexing agents is used for preventing $Fe^{+++}$ ion resulted from the reaction in the auxiliary redox system from causing sedimentation of an insoluble $Fe(OH)_3$. The patent specification describes that, for the carboxylic acid complexing agent, saturated mono-oxycarboxylic acid and dioxycarboxylic acid, particularly, $\alpha$- and $\beta$-OH carboxylic acids are preferred. As the concrete examples, there are enumerated in the patent specification: formic acid, acetic acid, citric acid, tartaric acid, succinic acid, malic acid, malonic acid, cyclopropane-1,2-dicarboxylic acid, and cyclopropane-1-OH,2-carboxylic acid.

Furthermore, this patented device controls the pH value of the color forming and bleaching medium to the side of a relatively strong acidity (i.e., pH=1 to 6, or preferably pH=1 to 4, or more preferably Ph=2 to 3) with a view to stabilizing the reaction of the auxiliary redox system ($Fe^{++} \rightleftarrows Fe^{+++}$).

Even in such improved image display device as described in the foregoing, however, there still remain difficult problems which prevent the device from being put into practical use. Such difficult problems are, for example: that reversibility in the oxidation-reduction reactions of the color forming and bleaching substance cannot be satisfactorily established, even when the auxiliary redox system performing the reaction of $Fe^{++} \rightleftarrows Fe^{+++}$ is used, hence insufficiency in the color forming and color bleaching, the side reaction in the color forming, and so forth tend to occur; that sedimentation of $Fe(OH)_3$ cannot be prevented, even if the carboxylic acid complexing agent is used, hence irregularity in the formed color would take place on the surface of the electrodes; that deterioration in the electrode material is apt to take place when the pH value of the color forming and bleaching medium is brought to the acid side (this tendency is particularly remarkable when an oxide electrode such as $SnO_2$, $In_2O_3$, etc. is used); and various other problems. On account of such various problems still to be solved, the situation as at present is that no image display device having satisfactory repetitive durability has yet been realized.

SUMMARY OF THE INVENTION

It is therefore an essential object of the present invention to provide an image display device which has overcome the defects as mentioned above, and exhibits excellent repetitive durability, or service life.

That is, the primary object of the present invention is to provide the image display device which does not bring about insufficiency in the color forming or color bleaching, even when the number of times of the image display becomes increased.

The secondary object of the present invention is to provide the image display device which does not bring about side-reaction, even when the number of times of the image display becomes increased.

The third object of the present invention is to provide the image display device which does not bring about irregularity in the formed color, even when the number of times of the image display becomes increased.

The fourth object of the present invention is to provide the image display device which does not bring about deterioration in the electrodes, even when the number of times of the image display becomes increased.

That is, the present invention provides the image display device for achieving the above-described objectives, more particularly, improved color forming and bleaching medium for use in such device.

In accordance with the present invention, there is provided an image display device comprising in combination: a cell container, at least a pair of electrodes, an electrically responsive electrochromic medium (color forming and bleaching medium) accommodated in said cell container, said electrochromic medium comprising a complexon.

The foregoing objects, other objects, and specific details of the device construction as well as the component for use in such color forming and bleaching medium will become more apparent from the following detailed description of the preferred examples thereof, when read in connection with the accompanying drawing.

BRIEF DESCRIPTION OF THE DRAWING

In the drawing:

FIGS. 2A, 2B, 2C and 2D are respectively schematic diagrams in cross-section showing typical layout of the electrodes for the image display device according to the present invention; and FIG. 3 is a graphical representation for explaining operating stages for the image display device according to the present invention.

DESCRIPTION OF THE PREFERRED EMBODIMENTS

Figure 1:
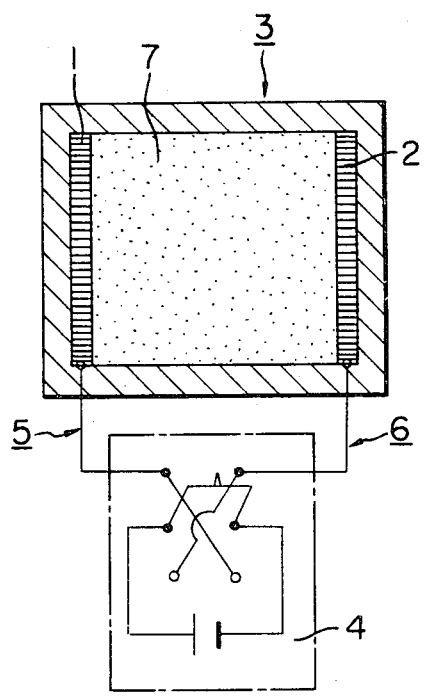
FIG. 1 is a schematic diagram showing the basic construction of the image display device according to the present invention.

The basic structure of the image display device according to the present invention is as shown in FIG. 1, in which a working electrode 1 and a counter electrode 2 are disposed in a cell 3 made of glass, etc., and both electrodes are connected to a power source 4 by lead lines 5 and 6. An electrically responsive color forming and bleaching medium 7 is sealed in the cell 3.

Electrode

First of all, preferred materials for the electrode may be those metals which are chemically safe such as platinum, palladium, gold, etc., or those metal oxides which are known as transparent electrode such as tin oxide, indium oxide, etc. Layout of the electrodes may be either on the same plane, or mutually opposed on different planes in the cell container. The electrode is basically composed of a pair of working and counter electrodes. A separate reference electrode may be used together depending on an operating system of the image display device. It should be noted that selection of the electrode material, layout of the electrodes within the cell container, construction of the electrodes, and so on may be arbitrarily chosen in accordance with specification of the device.

Figure 2A:
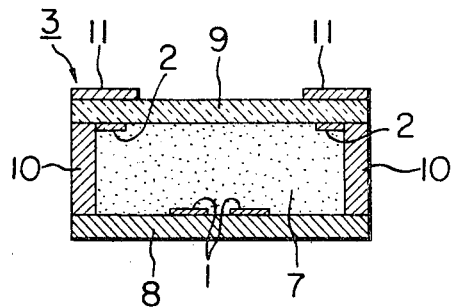
Figure 2B:
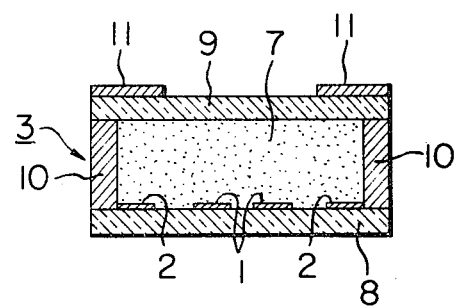

Illustrating some actual layouts of the electrode, FIG. 2A shows the cell 3, in which the working electrodes 1 are placed on a transparent or nontransparent base plate 8, the counter electrodes 2 are placed on the lower surface of a transparent base plate 9 which is opposed to the base plate 8 through a spacer 10, and the thus arranged counter electrodes 2 are concealed by appropriate masking plates 11 placed on the upper surface of the base plate 9. FIG. 2B indicates that both working electrodes 1 and the counter electrodes 2 are disposed on the one and same base plate 8, either transparent or nontransparent. FIG. 2C shows the cell 3, in which the counter electrodes 2 are placed on the transparent or nontransparent base plate 8, the working electrodes 1 are placed on the lower surface of the transparent base plate 9 which is opposed to the base plate 8 through the spacer 10, and the counter electrodes 2 are concealed by a non-transparent film 12 having an ion transmitting property. FIG. 2D shows the cell 3, in which the working electrodes 1 are placed on the transparent or non-transparent base plate 8, and the counter electrodes 2 are fixed on the upright spacer 10.

It should be noted that, besides the abovementioned electrode layouts, various other layouts may be appropriately chosen for the purpose of the present invention.

Electrochemical Color Forming and Bleaching Medium

The electrically responsive color forming and bleaching medium for use in the present invention can be obtained by adding a complexon, to be described in detail later, to a composition principally including an electrochemical color forming and bleaching substance (which can also be regarded as an organic substance having the redox reactivity) and an electrolyte. Adjuvants such as auxiliary redox system additives, buffer solutions, etc. may also be added to the medium. The thus obtained electrically responsive color forming and bleaching medium is usually used in the form of a solution in water, etc. as a solvent.

There is no particular limitation to the kinds of the electrochemical color forming and bleaching subtance to be used in the present invention, and a very wide variety of organic substances having the redox reactivity may be exemplified.

For example, as pyridinium compounds having the quaternary ammonium salt structure, there may be mentioned the following:

1,1'-dimethyl-4,4'-bipyridinium dibromide,
1,1'-diethyl-4,4'-bipyridinium dibromide,
1,1'-dihepthyl-4,4'-bipyridinium dibromide,
1,1'-dibenzyl-4,4'-bipyridinium dibromide,
N,N'-di(p-cyanophenyl)-4,4'-bipyridinium dichloride,
2,2'-(diethyl)bipyridinium dichloride,
N,N'-diethyl-2,7-diazapyrenium dichloride,
N-benzyl-4-cyano-pyridinium bromide, and the like.

As the redox indicator, there may be mentioned: Safranine T, Neutral Red, Indigo monosulphanic acid, diphenylamine, diphenylamine-p-sulphonic acid, p-nitro diphenylamine, diphenylamine-2,3'-dicarboxylic acid, diphenylamine-2,2'-dicarboxylic acid, and the like.

For the electrolyte, there may be utilized potassium bromide, potassium chloride, etc. as the representative ones. Besides these, potassium acetate, sulfuric acid, nitric acid, dihydrophosphoric acid, etc. may also be used as the preferable electrolytes.

For the solvent, there may be used water, in general. Depending on the kind of the electrochemical color forming and bleaching substance, however, mixed solvents of water and methyl alcohol, dimethyl formamide, etc., or their mixture may sometimes be used.

In addition to the above, there is added the complexon as the essential component for the electrochromic medium of the present invention. The complexon to be used in the present invention is designated, from the structural point of view, by those derivatives of aminopolycarboxylic acid (amino acetic acids or amino propionic acids) or their structural homologues. Actual examples of such complexons are enumerated in the following. All these compounds were verified to exhibit equally remarkable effect.

(1) Ethylenediaminetetraacetic acid (EDTA),
(2) Dihydroxyethylglycine (DHEG),
(3) Diaminopropanoltetraacetic acid (DPTA-OH),
(4) Ethylenediaminediacetic acid dipropionic acid (EDAPDA),
(5) Diaminopropane tetraacetic acid (Methyl-EDTA),
(6) Hydroxyethylenediaminetriacetic acid (EDTA-OH),
(7) Diethylenetriaminepentaacetic acid (DTPA),
(8) Ethylenediaminediacetic acid (EDDA),
(9) Ethylenediaminedipropionic acid (EDDP),
(10) Glycoletherdiaminetetraacetic acid (GEDTA),
(11) Ethylenediaminediorthhydroxyphenylacetic acid (EDDHA),
(12) Hydroxyethyliminodiacetic acid (HIDA),
(13) Iminodiacetic acid (IDA),
(14) Nitrilotriacetic acid (NTA),
(15) Nitrilotripropionic acid (NTP),
(16) Triethylenetetraminehexaacetic acid (TTHA),
(17) Metaphenylenediaminetetraacetic acid (m-PHDTA),
(18) N-methyliminodiacetic acid,
(19) N-cyclohexyliminodiacetic acid,
(20) N-phenyliminodiacetic acid,
(21) Benzylamine-N,N-diacetic acid,
(22) N-(2-furylmethyl)iminodiacetic acid,
(23) N-(2-tetrahydropyranylmethyl)iminodiacetic acid,
(24) Z-aminomethylpyridine-N,N-diacetic acid,
(25) N-(2-methoxymethyl)iminodiacetic acid,
(26) N-(2-methylthioethyl)iminodiacetic acid,
(27) N-(3-hydroxypropyl)iminodiacetic acid,
(28) N-(2-hydroxycyclohexyl)iminodiacetic acid,
(29) N-(o-hydroxyphenyl)iminodiacetic acid,
(30) o-hydroxybenzylamine-N,N-diacetic acid,
(31) N-2-mercaptoethyliminodiacetic acid,
(32) N-(o-mercaptophenyl)iminodiacetic acid,
(33) N-cyanomethyliminodiacetic acid,
(34) N-(2-aminoethyl)iminodiacetic acid: [ethylenediamine-N,N-diacetic acid],
(35) N-(carbamoylmethyl)iminodiacetic acid,
(36) Aminoacetone-N,N-diacetic acid,
(37) ω-aminoacetophenone-N,N-diacetic acid,
(38) Z-glycylthiophene-N,N-diacetic acid,
(39) N-(o-carboxyphenyl)iminodiacetic acid,
(40) Nitrilodiacetic acid-methylenephosphonic acid,

(41) Nitriloacetic acid-di(methylenephosphonic acid),
(42) Ethylenediamine-N,N'-di-α-propionic acid,
(43) N,N'-di(2-hydroxybenzyl)ethylenediamine-N,N'-diacetic acid,
(44) N,N'-ethylene-bis(2-aminomethylpyridine)-N,N'-diacetic acid,
(45) Ethylenediamine-N,N'-diacetic acid-N,N'-diacetohydroxamic acid,
(46) N-butylethylenediamine-N,N',N'-triacetic acid,
(47) N-cyclohexylethylenediamine-N,N',N'-triacetic acid,
(48) N-octylethylenediamine-N,N',N'-triacetic acid,
(49) N-eicosylethylenediamine-N,N',N'-triacetic acid,
(50) N-benzylethylenediamine-N,N',N'-triacetic acid,
(51) d,l-2,3-diaminobutane-N,N,N',N'-tetraacetic acid,
(52) meso-2,3-diaminobutane-N,N,N',N'-tetraacetic acid,
(53) 1-phenylethylenediamine-N,N,N',N'-tetraacetic acid,
(54) d,l-1,2-diphenylethylenediamine-N,N,N',N'-tetraacetic acid,
(55) 1,3-diaminopropane-N,N,N',N'-tetraacetic acid,
(56) 1,4-diaminobutane-N,N,N',N'-tetraacetic acid,
(57) 1,5-diaminopentane-N,N,N',N'-tetraacetic acid,
(58) 1,6-diaminohexane-N,N,N',N'-tetraacetic acid,
(59) 1,8-diaminooctane-N,N,N',N'-tetraacetic acid,
(60) trans-cyclobutane-1,2-diamine-N,N,N',N'-tetraacetic acid,
(61) trans-cyclopentane-1,2-diamine-N,N,N',N'-tetraacetic acid,
(62) trans-cyclohexane-1,2-diamine-N,N,N',N'-tetraacetic acid (trans type CyDTA),
(63) cis-cyclohexane-1,2-diamine-N,N,N',N'-tetraacetic acid (cis type CyDTA),
(64) Cyclohexane-1,3-diamine-N,N,N',N'-tetraacetic acid,
(65) Cyclohexane-1,4-diamine-N,N,N',N'-tetraacetic acid,
(66) o-phenylenediamine-N,N,N',N'-tetraacetic acid,
(67) cis-1,4-diaminobutene-N,N,N',N'-tetraacetic acid,
(68) trans-1,4-diaminobutene-N,N,N',N'-tetraacetic acid,
(69) α,α'-diamino-o-xylene-N,N,N',N'-tetraacetic acid,
(70) 3,3'-oxy-bis(propyliminodiacetic acid),
(71) 2,2'-oxy-bis(ethyliminodiacetic acid),
(72) 2,2'-thio-bis(ethyliminodiacetic acid),
(73) 2,2'-ethylene-bis-thio(ethyliminodiacetic acid),
(74) N,N'-glycylethylenediamine-N'',N'',N''',N'''-tetraacetic acid,
(75) Ethylenediamine-N,N'-diacetic acid-N,N'-di-α-propionic acid,
(76) Ethylenediamine-N,N,N',N'-tetrapropionic acid,
(77) Ethylenediamine-N,N'-di(acetylglycine)-N,N'-diacetic acid,
(78) Ethylenediamine-N,N'-diacetic acid-N,N'-di(methylenephosphonic acid),
(79) 1,2,3-triaminopropane-N,N,N',N',N'',N''-hexaacetic acid,
(80) Nitrilotri(methylenephosphonic acid),
(81) Ethylenediamine-N,N'-di(methylenephosphinic acid),
(82) Ethylendiamine-N,N'-di(methylenephosphonic acid),
(83) Ethylenedimine-N,N,N',N'-tetra(methylenephosphinic acid),
(84) Ethylenediamine-N,N,N',N'-tetra(methylenephosphonic acid),
(85) Cyclohexane-1,2-diamine-N,N,N',N'-tetra (methylenephosphonic acid),
(86) N,N'-bis(2-hydroxybenzyl)ethylenediamine-N,N'-bis(methylene-phosphonic acid),
(87) 3-(diphenylphosphine)propionic acid,
(88) 3-diphenylarsine)propionic acid,
(89) As-phenylarsinediacetic acid,
(90) As-(p-chlorophenyl)arsinedipropionic acid,
(91) Metaxylylenediamine tetraacetic acid (m-XDTA), and the like. In addition, metallic salts of these compounds which have no chelate structure may be preferably used. The most representative metallic salts are the ionic metallic salts of alkali metals. It may also be possible to add metallic salts in the form of a chelate of polyvalent metals such as alkaline earth metals and the abovementioned complexons. When metallic salts are added to the color forming and bleaching medium in the form of the chelate, more favorable results would be obtained.

For the preferable metal ions to form the chelate with the abovementioned complexons, there are: $Ag^+$, $Al^{+++}$, $Ba^{++}$, $Be^{++}$, $Ca^{++}$, $Cd^{++}$, $Co^{++}$, $Cu^{++}$, $Fe^{++}$, $Hg^+$, $La^{+++}$, $Mg^{++}$, $Mn^{++}$, $Ni^{++}$, $Pb^{++}$, $Sn^{++}$, $Sr^{++}$, $Tl^{++}$, $V^{++}$, and $Zn^{++}$. Of these ions, $Al^{+++}$, $Ba^{++}$, $Ca^{++}$, $Fe^{++}$, $Hg^{++}$, $Mg^{++}$, $Mn^+$, $Sr^{++}$ and $Tl^{++}$ are particularly preferable.

Except for compounds 2, 40 and 78, the above-identified aminocarboxylic acid derivatives have structures which may be grouped as follows:

(1) an aminocarboxylic acid compound containing 1 to 3 aminocarboxylic acid groups represented by the following formula(I)

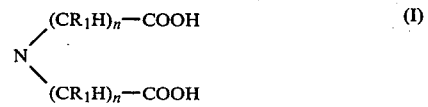

wherein $R_1$ represents hydrogen, methyl or hydroxyphenyl and n is 1 or 2 (compounds 1, 3–6, 10, 12, 13, 17–39, 51–76, 79 and 91);

(2) an aminocarboxylic acid compound containing 1 to 2 aminocarboxylic acid groups represented by formula(I) above and 1 to 2 aminocarboxylic acid groups represented by the following formula(II):

wherein $R_1$ and n have the same meaning as in formula(I) (compounds 7, 16 and 46–50);

(3) an aminocarboxylic acid compound containing an aminocarboxylic acid group represented by the following formula

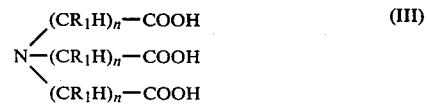

wherein $R_1$ and n have the same meaning as in formula(I) (compounds 14 and 15);

(4) an aminocarboxylic acid compound containing 2 aminocarboxylic acid groups represented by the following formula(IV):

$$N—(CR_1H)—COOH \qquad (IV)$$

wherein $R_1$ and n mean the same as in formula(I) (compounds 8, 9, 11, 42-45 and 77);

(5) nitrogen, phosphorus and arsenic homologues thereof containing 1 to 2 groups represented by the following formula(V):

$$A—(CH_2)_n—B \qquad (V)$$

wherein n is 1 or 2, A represents N, P or As and B represents —COOH,

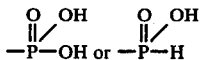

with the proviso that B is not —COOH when A is N (compounds 81, 82 and 86-88);

(6) nitrogen, phosphorus and arsenic homologues thereof containing 1 to 2 groups represented by the following formula(VI):

wherein n, A and B mean the same as in formula(V) (compounds 41, 83-85, 88 and 90);

(7) nitrogen, phosphorus and arsenic homologues thereof containing 1 group represented by the following formula(VII):

wherein n, A and B mean the same as in formula(V), (compound 80).

The above-enumerated complexons can be effectively used in the range of from 0.0001% by weight to 10% by weight, or, more preferably, from 0.01% by weight to 5% by weight, with respect to the electrically responsive color forming and bleaching medium composed of the electrochemical color forming and bleaching substance, the electrolyte, and water or a mixed solvent consisting of water and an organic solvent. Since the adding quantity of the complexon is dependent on the kind and quantity of the color forming and bleaching medium, the abovementioned range for the adding quantity is rather relative, and not absolute. Also, the complexon may be used not only singly, but also in combination of more than two kinds.

The addition of such component makes it possible to readily perform the cyclic operations, i.e., deposition of the electochemical color forming and bleaching substance onto the electrodes and its dissolution, which operations are the essential mechanism of the electrochemichromism, whereby insufficiency in the color forming or color bleaching, occurrence of the side-reaction in the color forming, irregularity in the formed color, deterioration in the electrodes, and various other disadvantages can be prevented from taking place, even when the number of times of the repetitive use of the cell becomes increased. In other words, accumulation of unnecessary deposit on the electrodes to occur, when the repetitive number of times of the write-in, memory, and erasure is increased, can be prevented, whereby the repetitive image display operations of the device can be prolonged at a great stride from a several tens of times to several hundreds of times in comparison with the conventional image display device.

In order to enable skilled persons in the art to appreciate the effect to be resulted from the present invention, and to readily reduce it into practice, the following preferred examples are presented.

EXAMPLES 1 to 75

The cells for the image display device according to the present invention were fabricated in the following manner, and their durability through repetitive use was examined.

(1) Mutually opposed electrodes were arranged within the glass cell;

(2) transparent electrode of tin oxide having a resistance value of 15 ohms/cm² was used for both working and counter electrodes, each electrode being in a rectangular shape having a size of 2 mm × 3 mm;

(3) an interval or gap of 2 mm was provided between the working and counter electrodes; and (4) solution of various compositions as tabulated in the following was filled in each cell.

The thus obtained various cells were operated by applying a potential cycle of $-2$ V (2 sec.)$\to 0$ V (0.5 sec.)$\to +2$ V (2 sec.) from a direct current source, as shown in FIG. 3, across the working electrode and the counter electrode disposed in the cell, and the durability of the cell for its repeated cyclic operations of color forming→memory→erasure (color bleaching) was tested. Incidentally, FIG. 3 indicates each of the operating waveforms for the color forming step 13, the memory step 14, and the color bleaching step 15. The repetitive durability of the cell was estimated by the number of repeated times until residual image or irregularity in the formed color will occur on the electrodes, when the cyclic operations of the color forming, memory, and color bleaching were continued through the above-described operating method. The test results are recapitulated in the following table.

COMPARATIVE EXAMPLES 1 to 4

For the sake of comparison, the composition for the color forming and bleaching medium in the above-described prescriptions for the examples was altered in various ways, and the repetitive durability of the image display element was tested in the same manner as in the actual examples. The test results are shown in the following table in comparison with those of the examples.

| Sample | Color-forming and bleaching substance (concentration) | Electrolyte (concentration)/solvent | Complexon (concentration) | Repetitive durability (number of time) |
| --- | --- | --- | --- | --- |

| | | -continued | | |
|---|---|---|---|---|
| 1 | 1,1'-diheptyl-4,4'-bipyridinum dibromide (0.1 mol/l) | Potassium bromide (0.3 mol/l)/water | Disodium salt of EDTA (0.03 wt. %) | $5 \times 10^5$ |
| 2 | 1,1'-diheptyl-4,4'-bipyridinium dibromide (0.1 mol/l) | Potassium bromide (0.3 mol/l)/water | trans type CyDTA (0.03 wt. %) | $7 \times 10^5$ |
| 3 | 1,1'-diheptyl-4,4'-bipyridinium dibromide (0.1 mol/l) | Potassium acetate (0.3 mol/l)/water | DHEG (0.06 wt. %) | $4 \times 10^6$ |
| 4 | 1,1'-diheptyl-4,4'-bipyridinium dibromide (0.1 mol/l) | Potassium acetate (0.3 mol/l)/water | Dilithium salt of m-XDTA (0.03 wt. %) | $9 \times 10^5$ |
| 5 | 1,1'-diheptyl-4,4'-bipyridinium dibromide (0.1 mol/l) | Potassium acetate (0.3 mol/l)/water | IDA (0.09 wt. %) | $3 \times 10^5$ |
| 6 | 1,1'-dibenzyl-4,4'-bipyridinium dibromide (0.1 mol/l) | Ferrous ammonium sulfate (0.3 mol/l)/water | EDTA (0.05 wt. %) | $4 \times 10^5$ |
| 7 | 1,1'-dibenzyl-4,4'-bipyridinium dibromide (0.1 mol/l) | Ferrous ammonium sulfate (0.3 mol/l)/water | Disodium salt of trans type CyDTA (0.06 wt. %) | $6 \times 10^5$ |
| 8 | 1,1'-dibenzyl-4,4'-bipyridinium dibromide (0.1 mol/l) | Ferrous ammonium sulfate (0.3 mol/l)/water | DPTA-OH (0.04 wt. %) | $8 \times 10^5$ |
| 9 | 1,1'-dibenzyl-4,4'-bipyridinium dibromide (0.1 mol/l) | Dihydrophosphoric acid (0.3 mol/l)/water | EDAPDA (0.03 wt. %) | $8 \times 10^4$ |
| 10 | 1,1'-dibenzyl-4,4'-bipyridinium dibromide (0.1 mol/l) | Dihydrophosphoric acid (0.3 mol/l)/water | DTPA (0.02 wt. %) | $5 \times 10^5$ |
| 11 | 1,1'-dibenzyl-4,4'-bipyridinium dibromide (0.1 mol/l) | Dihydrophosphoric acid (0.3 mol/l)/water | Monosodium salt of NTP (0.06 wt. %) | $7 \times 10^5$ |
| 12 | 1,1'-dimethyl 4,4'-bipyridinium dibromide (0.1 mol/l) | Lithium chloride (0.3 mol/l)/methanol | EDTA (0.03 wt. %) | $2 \times 10^4$ |
| 13 | 1,1'-dimethyl 4,4'-bipyridinium dibromide (0.1 mol/l) | Lithium chloride (0.3 mol/l)/methanol | Methyl-EDTA (0.03 wt. %) | $4 \times 10^4$ |
| 14 | 1,1'-dimethyl 4,4'-bipyridium dibromide (0.1 mol/l) | Potassium chloride (0.3 mol/l)/water | EDDA (0.03 wt. %) | $7 \times 10^4$ |
| 15 | 1,1'-dimethyl 4,4'-bipyridinium dibromide (0.1 mol/l) | Potassium chloride (0.3 mol/l)/water | HIDA (0.05 wt. %) | $6 \times 10^4$ |
| 16 | 1,1'-diheptyl 4,4'-bipyridinium dibromide (0.1 mol/l) | Potassium bromide (0.3 mol/l)/water | N-methyliminodiacetic acid (0.03 wt. %) | $4 \times 10^5$ |
| 17 | 1,1'-diheptyl-4,4'-bipyridinium dibromide (0.1 mol/l) | Potassium bromide (0.3 mol/l)/water | Benzylamine-N,N-diacetic acid (0.05 wt. %) | $6 \times 10^4$ |
| 18 | 1,1'-diheptyl-4,4'-bipyridinium dibromide (0.1 mol/l) | Potassium bromide (0.3 mol/l)/water | N-(2-methoxyethyl)iminodiacetic acid (0.03 wt. %) | $8 \times 10^4$ |
| 19 | 1,1'-diheptyl 4,4'-bipyridinium dibromide (0.1 mol/l) | Potassium acetate (0.4 mol/l)/water | N-(3-hydroxypropyl) iminodiacetic acid (0.03 wt. %) | $3 \times 10^5$ |
| 20 | 1,1'-diheptyl 4,4'-bipyridinium dibromide (0.1 mol/l) | Potassium acetate (0.4 mol/l)/water | N-2-mercapto-ethyl-iminodiacetic acid (0.03 wt. %) | $1 \times 10^5$ |
| 21 | 1,1'-dimethyl 4,4'-bipyridinium dibromide (0.1 mol/l) | Lithium chloride (0.3 mol/l)/methanol | Aminoacetone-N,N-diacetic acid (0.05 wt. %) | $6 \times 10^4$ |
| 22 | 1,1'-dimethyl 4,4'-bipyridinium dibromide (0.1 mol/l) | Lithium chloride (0.3 mol/l)/methanol | Nitriloacetic acid-di(methylenephosphonic acid) (0.03 wt. %) | $5 \times 10^4$ |
| 23 | 1,1'-dimethyl 4,4'-bipyridinium dibromide (0.1 mol/l) | Lithium chloride (0.3 mol/l)/methanol | Ethylenediamine-N,N'-diacetic acid-N,N'-diacetohydroxamic acid (0.05 wt. %) | $7 \times 10^4$ |
| 24 | 1,1'-dimethyl 4,4'-bipyridinium dibromide (0.1 mol/l) | Potassium chloride (0.3 mol/l)/water | N-octylethylenediamine-N,N',N'-triacetic acid (0.03 wt. %) | $6 \times 10^4$ |
| 25 | 1,1'-dibenzyl-4,4'-bipyridinium dibromide (0.1 mol/l) | Dihydrophosphoric acid (0.3 mol/l)/water | 1,3-diaminopropane-N,N,N',N'-tetraacetic acid (0.03 wt. %) | $7 \times 10^4$ |
| 26 | 1,1'-dibenzyl 4,4'-bipyridinium dibromide (0.1 mol/l) | Potassium chloride (0.3 mol/l)/water | 1,8-diaminooctane-N,N',N',N'-tetraacetic acid (0.05 wt. %) | $8 \times 10^4$ |
| | 1,1'-dibenzyl 4,4'- | Ferrous ammonium | o-phenylenediamine-1,4- | |

-continued

| | | | | |
|---|---|---|---|---|
| 27 | bipyridinium dibromide (0.1 mol/l) | sulfate (0.3 mol/l)/water | diamine-N,N,N',N'-tetraacetic acid (0.03 wt. %) | $6 \times 10^5$ |
| 28 | 1,1'-dibenzyl 4,4'-bipyridinium dibromide (0.1 mol/l) | Ferrous ammonium sulfate (0.3 mol/l)/water | N,N'-glycylethylene-diamine-N'',N'',N''',N'''-tetraacetic acid (0.03 wt. %) | $8 \times 10^5$ |
| 29 | 1,1'-dibenzyl 4,4'-bipyridinium dibromide (0.1 mol/l) | Ferrous ammonium sulfate (0.3 mol/l)/water | Ethylenediamine-N,N' di(acetylglycine)-N,N'-diacetic acid (0.03 wt. %) | $6 \times 10^5$ |
| 30 | 1,1'-dibenzyl 4,4'-bipyridinium dibromide (0.1 mol/l) | Ferrous ammonium sulfate (0.3 mol/l)/water | TTHA (0.03 wt. %) | $6 \times 10^5$ |
| 31 | 1,1'-diheptyl 4,4'-bipyridinium dibromide (0.1 mol/l) | Ferrous ammonium sulfate (0.3 mol/l)/water | Ethylenediamine-N,N'-di (methylenephosphonic acid) (0.05 wt. %) | $6 \times 10^4$ |
| 32 | 1,1'-diheptyl 4,4'-bipyridinium dibromide (0.1 mol/l) | Ferrous ammonium sulfate (0.3 mol/l)/water | N,N'-bis(2-hydroxybenzyl) ethylenediamine-N,N'-bis (methylenephosphonic acid) (0.03 wt. %) | $8 \times 10^4$ |
| 33 | 1,1'-diheptyl 4,4'-bipyridinium dibromide (0.1 mol/l) | Potassium bromide (0.3 mol/l)/water | As-phenylarsine-diacetic acid (0.03 wt. %) | $7 \times 10^4$ |
| 34 | 1,1'-diheptyl 4,4'-bipyridinium dibromide (0.1 mol/l) | Potassium acetate (0.3 mol/l)/water | N-butylethylenediamine-N,N',N'-triacetic acid (0.05 wt. %) | $4 \times 10^5$ |
| 35 | 1,1'-diheptyl 4,4'-bipyridinium dibromide 0.1 mol/l) | Potassium acetate (0.3 mol/l)/water | N-(2-aminoethyl)imino-diacetic acid (0.05 wt. %) | $3 \times 10^5$ |
| 36 | 1,1'-diheptyl 4,4'-bipyridinium dibromide (0.1 mol/l) | Potassium acetate (0.3 mol/l)/water | NTA (0.03 wt. %) | $6 \times 10^5$ |
| 37 | 1,1'-diheptyl 4,4'-bipyridinium dibromide (0.1 mol/l) | Potassium acetate (0.3 mol/l)/water | EDDP (0.03 wt. %) | $2 \times 10^5$ |
| 38 | 1,1'-diheptyl 4,4'-bipyridinium dibromide (0.1 mol/l) | Potassium acetate (0.3 mol/l)/water | EDDHA (0.05 wt. %) | $2 \times 10^5$ |
| 39 | 1,1'-dimethyl 4,4'-bipyridinium dibromide (0.1 mol/l) | Potassium bromide (0.3 mol/l)/water | Ca-EDTA (0.15 wt. %) | $3 \times 10^5$ |
| 40 | 1,1'-dimethyl 4,4'-bypyridinium dibromide (0.1 mol/l) | Potassium bromide (0.3 mol/l)/water | Ag-transCyDTA (0.45 wt. %) | $4 \times 10^5$ |
| 41 | 1,1'-dimethyl 4,4'-bipyridinium dibromide (0.1 mol/l) | Potassium sulfate (0.3 mol/l)/water | Ba-DHEG (1.5 wt. %) | $1 \times 10^6$ |
| 42 | 1,1'-dimethyl 4,4'-bipyridinium dibromide- (0.1 mol/l) | Potassium sulfate (0.3 mol/1)/water | Zn-mXDTA (4.5 wt. %) | $7 \times 10^5$ |
| 43 | 1,1'-dimethyl 4,4'-bipyridinium dibromide (0.1 mol/l) | Ammonium phosphate (0.3 mol/l)/water | La-IDA (8.0 wt. %) | $3 \times 10^5$ |
| 44 | 1,1'-dimethyl 4,4'-bipyridinium dibromide (0.1 mol/l) | Ammonium phosphate (0.3 mol/l)/water | Mg-EDTA (9.0 wt. %) | $2 \times 10^5$ |
| 45 | 1,1'-dibenzyl 4,4'-bipyridinium dibromide (0.1 mol/l) | Potassium chloride (0.3 mol/l)/water | Pb-trans CyDTA (0.6 wt. %) | $6 \times 10^5$ |
| 46 | 1,1'-dibenzyl 4,4'-bipyridinium dibromide (0.1 mol/l) | Potassium chloride (0.3 mol/l)/water | Hg-DPTA (5.0 wt. %) | $4 \times 10^5$ |
| 47 | 1,1'-dibenzyl 4,4'-bipyridinium dibromide (0.1 mol/l) | Lithium chloride (0.3 mol/l)/methanol | Fe-EDPDA (0.20 wt. %) | $6 \times 10^5$ |
| 48 | 1,1'-dibenzyl 4,4'-bipyridinium dibromide (0.1 mol/l) | Lithium chloride (0.3 mol/l)/methanol | Mn-DTPA (0.45 wt. %) | $5 \times 10^5$ |
| 49 | 1,1'-dibenzyl 4,4'-bipyridinium dibromide (0.1 mol/l) | Lithium perchlorate (0.3 mol/l)/methanol | V-NTP (0.15 wt. %) | $6 \times 10^5$ |
| 50 | 1,1'-dibenzyl 4,4'-bipyridinium dibromide (0.1 mol/l) | Lithium perchlorate (0.3 mol/l)/methanol | Cd-EDTA (0.40 wt. %) | $7 \times 10^5$ |
| 51 | 1,1'-diheptyl 4,4'-bipyridinium dibromide (0.1 mol/l) | Potassium acetate (0.3 mol/l)/methanol | Sr-DHEG (0.10 wt. %) | $5 \times 10^5$ |
| 52 | 1,1'-diheptyl 4,4'-bipyridinium dibromide | Potassium acetate (0.3 mol/l)/methanol | Tl-EDDA (0.40 wt. %) | $2 \times 10^5$ |

-continued

| | Color-forming and bleaching substance (concentration) | Electrolyte (concentration)/solvent | Complexon (concentration) | Repetitive durability (number of time) |
|---|---|---|---|---|
| 53 | 1,1'-diheptyl 4,4'-bipyridinium dibromide (0.1 mol/l) | Potassium acetate (0.3 mol/l)/water | Mn-EDTA (3.5 wt. %) | $1 \times 10^6$ |
| 54 | 1,1'-diheptyl 4,4'-bipyridinium dibromide (0.1 mol/l) | Potassium acetate (0.3 mol/l)/water | Pb-trans CyDTA (6.0 wt. %) | $2 \times 10^6$ |
| 55 | 1,1'-diheptyl 4,4'-bipyridinium dibromide (0.1 mol/l) | Ammonium sulfate (0.3 mol/l)/ethylene water + glycol (50%) | Al-HIDA (0.1 wt. %) | $6 \times 10^5$ |
| 56 | 1,1'-diheptyl 4,4'-bipyridinium dibromide (0.1 mol/l) | Ammonium sulfate (0.3 mol/l)/ethylene water + glycol (50%) | Be-EDDHA (4.0 wt. %) | $8 \times 10^5$ |
| 57 | 1,1'-diheptyl 4,4'-bypyridinium dibromide (0.1 mol/l) | Potassium acetate (0.3 mol/l)/water | Cu-IDA (10.0 wt. %) | $3 \times 10^5$ |
| 58 | 1,1'-diheptyl 4,4'-bipyridinium dibromide (0.1 mol/l) | Potassium acetate (0.3 mol/l)/water | Mg-N-phenyliminodiacetic acid (2.0 wt. %) | $6 \times 10^5$ |
| 59 | 1,1-diheptyl 4,4'-bipyridinium dibromide (0.1 mol/l) | Potassium acetate (0.3 mol/l)/water | Ni-HIDA (1.0 wt. %) | $4 \times 10^5$ |
| 60 | 1,1'-diheptyl 4,4'-bipyridinium dibromide (0.1 mol/l) | Potassium chloride (0.3 mol/l)/water | Mg-N-(3-hydroxypropyl) iminodiacetic acid (6.0 wt. %) | $5 \times 10^5$ |
| 61 | 1,1'-diheptyl 4,4'-bipyridinium dibromide (0.1 mol/l) | Potassium chloride (0.3 mol/l)/water | Co-N-2-mercapto-ethyliminodiacetic acid (2.5 wt. %) | $3 \times 10^5$ |
| 62 | 1,1'-diheptyl 4,4'-bipyridinium dibromide (0.1 mol/l) | Potassium chloride (0.3 mol/l)/water | Zn-N-(2-aminoethyl) iminodiacetic acid (2.0 wt. %) | $4 \times 10^5$ |
| 63 | 1,1'-diheptyl 4,4'-bipyridinium dibromide (0.1 mol/l) | Potassium chloride (0.3 mol/l)/water | Ba-NTA (10.0 wt. %) | $8 \times 10^5$ |
| 64 | 1,1'-diheptyl 4,4'-bipyridinium dibromide (0.1 mol/l) | Potassium chloride (0.3 mol/l)/water | Ca-EDDA (1.0 wt. %) | $5 \times 10^5$ |
| 65 | 1,1'-dimethyl 4,4'-bipyridinium dibromide (0.1 mol/l) | Potassium bromide (0.3 mol/l)/water | Hg-EDDP (5.0 wt. %) | $3 \times 10^5$ |
| 66 | 1,1'-dimethyl 4,4'-bipyridinium dibromide (0.1 mol/l) | Potassium bromide (0.3 mol/l)/water | Cd-EDDHA (4.0 wt. %) | $4 \times 10^5$ |
| 67 | 1,1'-dimethyl 4,4'-bipyridinium dibromide (0.1 mol/l) | Potassium bromide (0.3 mol/l)/water | Sn-N-butylethylene-diamine-N,N',N'-triacetic acid (4.0 wt. %) | $2 \times 10^5$ |
| 68 | 1,1'-dimethyl 4,4'-bipyridinium dibromide (0.1 mol/l) | Potassium bromide (0.3 mol/l)/water | Tl-EDTA-OH (5.0 wt. %) | $5 \times 10^5$ |
| 69 | 1,1'-dimethyl 4,4'-bipyridinium dibromide (0.1 mol/l) | Lithium chloride (0.3 mol/l)/water | Sr-Methyl-EDTA (5.0 wt. %) | $7 \times 10^5$ |
| 70 | 1,1'-dimethyl 4,4'-bipyridinium dibromide (0.1 mol/l) | Lithium chloride (0.3 mol/l)/water | Pb-1,3-diaminopropane-N,N,N',N'-tetraacetic acid (2.5 wt. %) | $3 \times 10^5$ |
| 71 | 1,1'-dimethyl 4,4'-bipyridinium dibromide (0.1 mol/l) | Lithium chloride (0.3 mol/l)/water | V-1,8-diaminooctane-N,N,N',N', -tetraacetic acid (4.0 wt. %) | $4 \times 10^5$ |
| 72 | 1,1-dimethyl 4,4'-bipyridinium dibromide (0.1 mol/l) | Lithium chloride (0.3 mol/l)/water | Mg-o-phenylenediamine-N,N,N',N'-tetraacetic acid (4.0 wt. %) | $3 \times 10^5$ |
| 73 | 1,1'-dimethyl 4,4'-bipyridinium dibromide (0.01 mol/l) | Ammonium phosphate (0.3 mol/l)/water | Ca-DPTA-OH (4.0 wt. %) | $4 \times 10^5$ |
| 74 | 1,1-dibenzyl 4,4'-bipyridinium dibromide (0.1 mol/l) | Lithium chloride (0.3 mol/l)/methanol | Cu-N,N'-glycylethylene-diamine-N'',N'',N''',N''' tetraacetic acid (5.0 wt. %) | $6 \times 10^5$ |
| 75 | 1,1'-dibenzyl 4,4'-bipyridinium dibromide (0.1 mol/l) | Lithium chloride (0.3 mol/l)/methanol | Ba-TTHA (3.0 wt. %) | $6 \times 10^5$ |

| Comparative Example | Color-forming and bleaching substance (concentration) | Electrolyte (concentration)/solvent | Complexon (concentration) | Repetitive durability (number of time) |
|---|---|---|---|---|
| 1 | 1,1'-dimethyl 4,4'-bipyridinium dibromide (0.1 mol/l) | Potassium bromide (0.3 mol/l)/water | none | $2 \times 10^2$ |
| 2 | 1,1'-dimethyl 4,4'-bipyridinium dibromide | Ferrous ammonium sulfate | none | $1 \times 10^3$ |

| | | -continued | | |
|---|---|---|---|---|
| | (0.1 mol/l) | (0.3 mol/l)/water | | |
| 3 | 1,1'-dimethyl 4,4'-bipyridinium dibromide (0.1 mol/l) | Ferrous ammonium sulfate (0.3 mol/l)/water | Tartaric acid (complexing agent) (0.05 wt. %) | $3 \times 10^3$ |
| 4 | 1,1'-diheptyl 4,4'-bipyridinium dibromide (0.1 mol/l) | Potassium bromide (0.3 mol/l)/water | none | $3 \times 10^3$ |
| 5 | 1,1'-diheptyl 4,4'-bipyridinium dibromide (0.1 mol/l) | Ferrous ammonium sulfate (0.3 mol/l)/water | none | $3 \times 10^4$ |
| 6 | 1,1'-diheptyl 4,4'-bipyridinium dibromide (0.1 mol/l) | Ferrous ammonium sulfate (0.3 mol/l)/water | Tartaric acid (complexing agent) (0.05 wt. %) | $5 \times 10^4$ |

What is meant by the term "electrochromic medium" in the claims is the color forming and bleaching medium as mentioned in the foregoing.

What we claim is:

1. An improved image display device comprising in combination:
   (a) a cell container;
   (b) at least a pair of electrodes; and
   (c) an electrically responsive electrochromic medium accomodated in said cell container, said electrochromic medium comprising a complexon and a redox reactive organic substance, said complexon being a member selected from the group consisting of:
   (1) an aminocarboxylic acid compound containing 1 to 3 aminocarboxylic acid groups represented by the following formula(I)

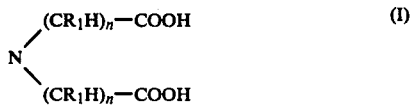 (I)

wherein $R_1$ represents hydrogen, methyl or hydroxyphenyl and n is 1 or 2;
   (2) an aminocarboxylic acid compound containing 1 to 2 aminocarboxylic acid groups represented by formula(I) above and 1 to 2 aminocarboxylic acid groups represented by the following formula(II):

 (II)

wherein $R_1$ and n have the same meaning as in formula(I);
   (3) an aminocarboxylic acid compound containing an aminocarboxylic acid group represented by the following formula

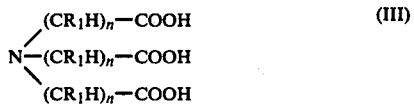 (III)

wherein $R_1$ and n have the same meaning as in formula(I);
   (4) an aminocarboxylic acid compound containing 2 aminocarboxylic acid groups represented by the following formula(IV):

 (IV)

wherein $R_1$ and n mean the same as in formula(I);
   (5) an aminocarboxylic acid compound selected from the group consisting of

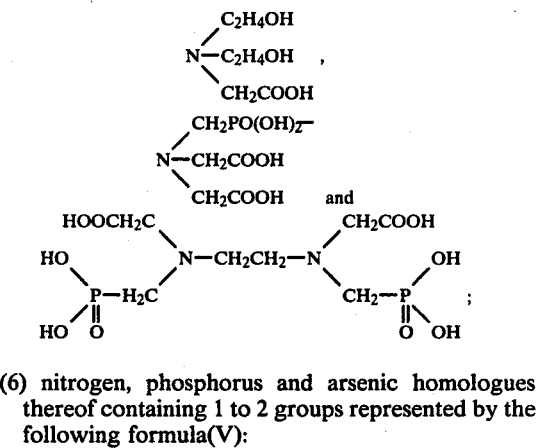

(6) nitrogen, phosphorus and arsenic homologues thereof containing 1 to 2 groups represented by the following formula(V):

 (V)

wherein n is 1 or 2, A represents N, P or As and B represents —COOH,

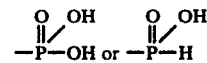

with the proviso that B is not —COOH when A is N;
   (7) nitrogen, phosphorus and arsenic homologues thereof containing 1 to 2 groups represented by the following formula(VI):

 (VI)

wherein n, A and B mean the same as in formula(V);
   (8) nitrogen, phosphorus and arsenic homologues thereof containing 1 group represented by the following formula(VII):

 (VII)

wherein n, A and B mean the same as in formula(V); and
   (9) mixtures thereof.

2. The image display device as claimed in claim 1, wherein said complexon is in the form of a metal chelate.

3. The image display device as claimed in claim 1, wherein the content of said complexon in said electrochromic medium ranges from 0.0001 to 10% by weight.

4. The image display device as claimed in claim 1, wherein the content of said complexon in said electrochromic medium ranges from 0.01 to 5% by weight.

5. The image display device as claimed in claim 1, wherein said electrically responsive electrochromic medium is a solution of said redox reactive organic substance, said complexon and an electrolyte in a solvent therefor.

6. The image display device as claimed in claim 1, wherein said complexon is selected from the group consisting of ethylenediaminetetraacetic acid, dihydroxyethylglycine, diaminopropanoltetraacetic acid, ethylenediaminediacetic acid dipropionic acid, diaminopropane tetraacetic acid, hydroxyethylenediaminetriacetic acid, diethylenetriaminepentaacetic acid, ethylenediaminediacetic acid, ethylenediaminedipropionic acid, glycoletherdiaminetetraacetic acid, ethylenediaminediorthhydroxyphenylacetic acid, hydroxyethyliminodiacetic acid, iminodiacetic acid, nitrilotriacetic acid, nitrilotripropionic acid, triethylenetraminehexaacetic acid, metaphenylenediaminetetraacetic acid, N-methyliminodiacetic acid, N-cyclohexyliminodiacetic acid, N-phenyliminodiacetic acid, benzylamine-N,N-diacetic acid, N-(2-furylmethyl)iminodiacetic acid, N-(2-tetrahydropyranyl-methyl)iminodiacetic acid, Z-aminomethylpyridine-N,N-diacetic acid, N-(2-methoxyethyl)iminodiacetic acid, N-(2-methylthioethyl)iminodiacetic acid, N-(3-hydroxypropyl)iminodiacetic acid, N-(2-hydroxycyclohexyl) iminodiacetic acid, N-(o-hydroxyphenyl)iminodiacetic acid, o-hydroxybenzylamine-N,N-diacetic acid, N-2-mercaptoethyliminodiacetic acid, N-(o-mercaptophenyl)iminodiacetic acid, N-cyanomethyliminodiacetic acid, N-(2-aminoethyl)iminodiacetic acid, N-(carbamoylmethyl)iminodiacetic acid, aminoacetone-N,N-diacetic acid, ω-aminoacetophenone-N,N-diacetic acid, Z-glycylthiophene-N,N-diacetic acid, N-(o-carboxyphenyl)iminodiacetic acid, nitrilodiacetic acid-methylenephosphonic acid, nitriloacetic acid-di(methylenephosphonic acid), ethylenediamine-N,N'-di-α-propionic acid, N,N'-di(2-hydroxybenzyl) ethylenediamine-N,N'-acetic acid, N,N'-ethylene-bis(2-aminomethylpyridine)-N,N'-diacetic acid, ethylenediamine-N,N'-diacetic acid-N,N'-diacetohydroxamic acid, N-butylethylenediamine-N,N',N'-triacetic acid, N-cyclohexylethylenediamine-N,N',N'-triacetic acid, N-octylethylenediamine-N,N',N'-triacetic acid, N-eicosylethylenediamine-N,N,N'-triacetic acid, N-benzylethylenediamine-N,N',N'-triacetic acid, d,l,-2,3-diaminobutane-N,N,N',N'-tetraacetic acid, meso-2,3-diaminobutane-N,N,N',N',-tetraacetic acid, 1-phenylethylenediamine-N,N,N',N'-tetraacetic acid, d,l-1,2-diphenylethylenediamine-N,N,N',N'-tetraacetic acid, 1,3-diaminopropane-N,N,N',N'-tetraacetic acid, 1,4-diaminobutane-N,N,N',N'-tetraacetic acid, 1,5-diaminopentane-N,N,N',N'-tetraacetic acid, 1,6-diaminohexane-N,N,N',N'-tetraacetic acid, 1,8-diaminooctane-N,N,N',N'-tetraacetic acid, trans-cyclobutane-1,2-diamine-N,N,N',N'-tetraacetic acid, trans-cyclopentane-1,2-diamine-N,N,N',N'-tetraacetic acid, trans-cyclohexane-1,2-diamine-N,N,N',N'-tetraacetic acid, cis-cyclohexane-1,2-diamine-N,N,N',N'-tetraacetic acid, cyclohexane-1,3-diamine-N,N,N',N'-tetraacetic acid, cyclohexane-1,4-diamine-N,N,N',N'-tetraacetic acid, o-phenylenediamine-N,N,N',N'-tetraacetic acid, cis-1,4-diaminobutene-N,N,N',N'-tetraacetic acid, trans-1,4-diaminobutene-N,N,N',N'-tetraacetic acid, α,α'-diamino-o-xylene-N,N,N',N'-tetraacetic acid, 3,3'-oxy-bis(propyliminodiacetic acid), 2,2'-oxy-bis(ethyliminodiacetic acid), 2,2'-thio-bis(ethyliminodiacetic acid), 2,2'-ethylene-bis-thio-(ethyliminodiacetic acid), N,N'-glycylethylenediamine-N'',N'',N''',N'''-tetraacetic acid, ethylenediamine-N,N'-diacetic acid-N,N'-di-α-propionic acid, ethylenediamine-N,N',N'-tetrapropionic acid; ethylenediamine-N,N'-di(acetylglycine)-N,N'-diacetic acid, ethylenediamine-N,N'-diacetic acid-N,N'-di(methylene-phosphonic acid), 1,2,3-triaminopropane-N,N,N',N',N'',N''-hexaacetic acid, nitrilotri(-methylenephosphonic acid), ethylenediamine-N,N'-di(-methylenephosphinic acid), ethylenediamine-N,N'-di(-methylenephosphonic acid), ethylenediamine-N,N,N',N'-tetra(methylenephosphinic acid), ethylenediamine-N,N,N',N'-tetra(methylenephosphonic acid), cyclohexane-1,2-diamine-N,N,N',N'-tetra(methylenephosphonic acid), N,N'-bis(2-hydroxybenzyl)ethylenediamine-N,N'-bis(methylenephosphonic acid), 3-(diphenylphosphine)propionic acid, 3-(diphenylarsine)propionic acid, As-phenylarsinediacetic acid, As-(p-chlorophenyl)arsinedipropionic acid, and metaxylylenediamine tetraacetic acid.

7. The image display device as claimed in claim 1, wherein said redox reactive organic substance is a pyridinium compound having a quaternary ammonium salt structure.

8. The image display device as claimed in claim 7, wherein said pyridinium compound is a bipyridinium salt.

9. The image display device as claimed in claim 5, wherein said electrolyte is selected from the group consisting of potassium bromide, potassium chloride, potassium acetate, sulfuric acid, nitric acid and dihydrophosphoric acid.

10. The image display device as claimed in claim 5, wherein said solvent is selected from the group consisting of water, an organic solvent and mixtures thereof.

11. The image display device as claimed in claim 1, wherein said complexon is in the form of a metallic salt thereof.

12. The image display device as claimed in claim 11, wherein said metallic salt is an alkali metal salt.

13. The image display device as claimed in claim 2, wherein said metal is an alkaline earth metal.

14. The image display device as claimed in claim 2, wherein said metal is selected from the group consisting of Al, Ba, Ca, Fe, Hg, Mg, Mn, Sr and Tl.

* * * * *

UNITED STATES PATENT AND TRADEMARK OFFICE
CERTIFICATE OF CORRECTION

PATENT NO. : 4,212,518
DATED : July 15, 1980
INVENTOR(S) : HIROYUKI IMATAKI, ET AL.

It is certified that error appears in the above-identified patent and that said Letters Patent are hereby corrected as shown below:

In the Abstract, last line, "complexion" should read -- complexon --;
At column 6, line 52, "(2-methoxymethyl)" should read -- (2-methoxyethyl) --;
At column 8, line 28, "$Hg_+^+$" should read -- $Hg_{++}^{++}$ --;
At column 8, line 30, "$Mn_+^+$" should read -- $Mn^{++}$ --;

In the Table at columns 13-14, line 5 thereof, Sample 28, -- N",N",N",N''' -- should read -- N",N",N''',N''' --;
  in the fourth vertical column thereof, Sample 47, "Fe-EDPDA" should read -- Fe-EDAPDA --;
In the Table at columns 17-18, in the fifth vertical column thereof, first entry, "3 x $^3$" should read -- 3 x $10^3$ --;
In Claim 1, subparagraph (5), in the second structural formula therein, "$CH_2PO(OH)\frac{}{2}$" should read -- $CH_2PO(OH)_2$ --;

In Claim 6 at column 19, line 45, "acetic acid" should read --diacetic acid --.

Signed and Sealed this

Twenty-first Day of October 1980

[SEAL]

Attest:

SIDNEY A. DIAMOND

Attesting Officer     Commissioner of Patents and Trademarks